United States Patent Office 3,093,263
Patented June 11, 1963

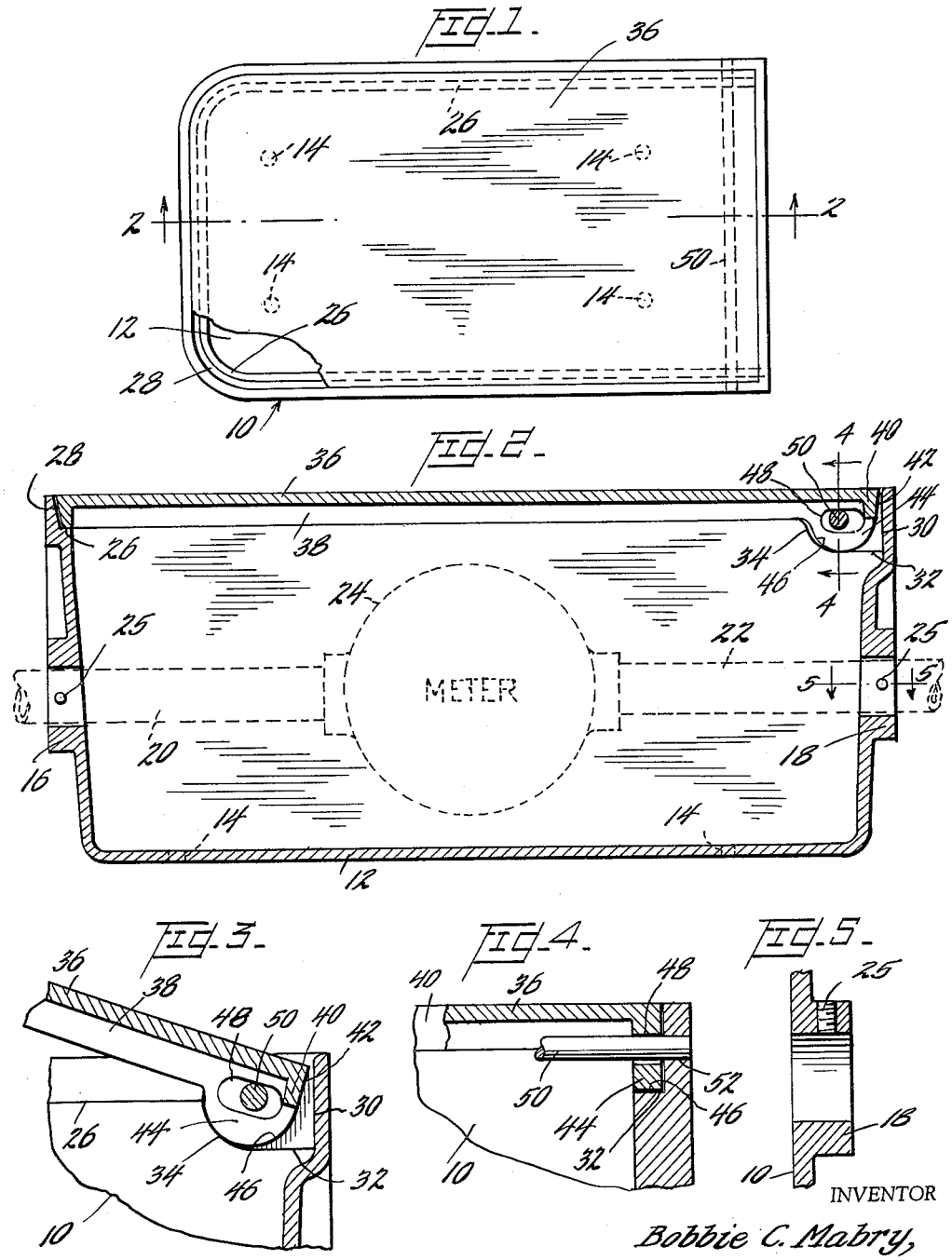

3,093,263
PROTECTIVE BOX FOR METERS
Bobbie C. Mabry, 3440 Evalon, Beaumont, Tex.
Filed July 25, 1961, Ser. No. 126,718
5 Claims. (Cl. 220—38)

This invention relates to a protective box, or receptacle, for utility meters and the like, and is primarily concerned with a hinged cover and cooperating box rim of novel construction and function. It is sometimes necessary to place a meter, such as a water meter, below ground level, and this requires a protective housing, largely underground, and with its top surface closely adjacent the ground level. It is a consequence of this arrangement, that entry of earth or other foreign matter is likely, at any time, and especially when the box is opened and closed, as at the time of meter reading, and it is an object of the invention to provide a cover which will minimize, if not obviate, such contamination. Also, in meter reading, it is highly desirable to open and close the receptacle rapidly, and it is therefore a further object of the invention to provide a hinged cover which is possessed of the aforesaid quality of minimizing contamination.

These and other ends, which will be readily apparent, are attained by the present invention, which may be briefly described as comprising a cover with bevelled edges nesting in a bevelled, innerly rabbeted box rim, and having a hinge in which the main action is provided by a pair of depending ears, with arcuate portions, each cooperating with a concentric, arcuate niche in the box rim, and a terminal edge which engages an inner, end wall of the box continuously, in a wiping action, during rotation of said portion in said niches, the ears having elongate openings loosely receiving a keeper pin, or rod, carried by the upright walls of the box.

For a more detailed description of the invention, reference is made to the following specification, as illustrated in the drawing, in which:

FIGURE 1 is a top plan of the receptacle, with its cover in place;

FIGURE 2 is a central, longitudinal section through the receptacle of FIGURE 1, taken on the line 2—2 of FIGURE 1;

FIGURE 3 is a fragmentary view, enlarged, of the hinge portion shown in FIGURE 2, at the upper, right hand corner of that figure, showing the cover in partially raised position;

FIGURE 4 is a sectional view, through the hinge, taken on the line 4—4 of FIGURE 2; and FIGURE 5 is a sectional view, taken on the line 5—5 of FIGURE 2.

Referring to the drawing by characters of reference, there is shown a generally rectangular, box-like, hollow receptacle 10, with a flat bottom 12, having a series of weep holes 14, for drainage of water. At its opposite ends, the box 10 has a pair of external bosses, 16, 18, centrally of the end faces, and bored to receive a pair of pipe sections 20, 22, which lead to, and are threadedly attached to, opposite ends of a meter 24, the pipes being secured in the bores by set screws 25, threaded in the bosses. These pipes may be water pipes, gas pipes, or conduits for electric wires, for instance.

At its upper rim, the box is internally rabbeted on one end, and on two sides, providing horizontal, shelf portions 26, and slant walls 28, which latter taper inwardly, in the downward direction. At the hinge end of the box, the end wall has an unbroken, inner, vertical surface 30, in the region of the hinge. Also at the hinge end, the inner, rabbeted portions on the two long sides of the box have counter recesses, each having a lowermost, horizontal shelf 32, extending from the wall 30 to an arcuate, inner terminus 34, which extends to the shelf 26 of the main, shallower recess.

Cooperating with the rabbeted recess, is the generally flat cover 36, having a depending bead 38 on one end and on two sides, with flat bottoms adapted to dwell on shelves 26, and bevelled, outer edges adapted to mate with slant walls 28. On its fourth side, the cover also has a depending bead 40, having an outer face 42, with a slight taper inwardly, in a downward direction. At this end, the cover has a pair of depending ears 44, having arcuate, lower edges 46, which extend from the lower ends of slant faces 42 to the bottoms of side beads 38. Ears 44 have central, generally elliptical slots 48, roughly centered on the center of curvature of lower edges 46 of the ears. A cross rod 50, with its ends secured in aligned bores 52 in the side faces of the box, passes through the slots 48 in the ears 44. The diameter of rod 50 is somewhat less than the width of slots 48, and the rod serves as a keeper, rather than as an actual pintle or pivot, and the journal action in the hinge involves a sliding and rolling action of curved, lower edges 46 of the ears, on the curved ramp 34, as urged into contact therewith by the rear corner of the cover, as it slides down inner surface 30 of the box. The small diameter of rod 50 provides the necessary play in the system for this wiping action. The said rear corner is thus necessarily in contact with the inner box surface in descending, so that any dirt on the cover is kept out, and is carried back up when the cover is closed. This scavenging action is assisted by the camming action of the slant, front bead of the cover, which provides a final thrust backwards on the cover, in the final stage of closing.

While a certain, preferred embodiment has been shown and described, modifications will be apparent, in the light of this disclosure, and the invention should not, therefore, be deemed as limited, except insofar as shall appear from the spirit and scope of the appended claims.

I claim:

1. A protective receptacle, for meters and the like, comprising a generally rectangular box, with four sides, a bottom having drain openings, and a swingable cover, two of said sides having bosses with aligned openings, the top edge of said box having a rabbeted, inner corner on three sides, with a side wall tapering inwardly in the downward direction, and the inner face of the fourth side being planar, said rabbeted corners on two sides having counter recesses adjacent said planar face, each with a horizontal shelf extending from said planar face, and an upwardly extending, arcuate, forward shelf, terminating at the rabbeted portion, a covering having downwardly depending beads at its periphery, on three sides, tapered on the outer face to mate with the rabbeted corners of the box, and a generally similar bead on its fourth side, a pair of ears depending from said beads at opposite ends of said bead on the fourth side, said ears having arcuate, lower edges, complementary to said arcuate shelf in the box, said ears having elongate openings extending in a direction parallel to the plane of said cover, and a keeper rod secured in the side of said box, received in said elongate openings, and having a diameter less than the width thereof.

2. A protective receptacle for meters and the like comprising a generally rectangular box with four sides, a bottom and a cover, the top edge of said box having a rabbeted, inner corner on three sides, with a side wall tapering inwardly in the downward direction, and the inner face of the fourth side being planar, said rabbeted corners on two sides having counter recesses adjacent said planar face, each with a horizontal shelf extending from said planar face, and an upwardly extending, arcuate, forward shelf, terminating at the rabbeted portion, a cover having downwardly depending beads at its periphery, on three sides, tapered on the outer face to mate with the rabbeted corners of the box, and a generally similar bead on its fourth side, a pair of ears depending from said beads at opposite ends of said bead on said fourth side, said ears having arcuate, lower edges, complementary to said arcuate shelf in the box, said ears having openings, elongate in a direction parallel to the plane of said cover, and a keeper rod secured in the side of said box, received in said elongate openings, and having a diameter less than the width thereof.

3. A protective receptacle for meters and the like, comprising an open-top box having a rabbeted, inner corner on the upper edge of at least one side, with a side wall inwardly tapered in a downward direction, and a pair of recesses in the inner walls of the two sides adjacent said one side, at the ends remote therefrom, said recesses having upwardly curving inners ends, a swingable cover for said box having a downwardly depending bead at one edge, with a tapering, outer face adapted to mate with said side wall, and having depending ears on two sides, convex in profile, and mating with said recesses, said ears having elongate openings extending in a direction parallel to the plane of said cover, and a keeper rod carried in the side of said box, passing through said openings, and having a diameter less than the width of said openings.

4. A protective receptacle for meters and the like comprising an open-top box with an inner, corner recess at the top edge of at least one side, and a pair of inner, curved recesses at the top edge of at least one side, and a pair of inner, curved recesses at the top edges of the two sides adjacent said one side, a cover having a depending bead adapted to engage the recess in said one side, and a pair of depending ears of curved profile, adapted to engage said curved recesses, and having elongate openings, a depending bead on the side of the cover opposite said one side, and a rod carried by the box sides having the curved recesses, passing through said openings, and having a diameter less than the smallest dimension of said openings.

5. A protective receptacle for meters and the like comprising an open-top box, two opposite sides of the box having vertical recesses of curved profile at one end of the box, a cover adapted to dwell on the top edges of the box, and having a pair of depending ears on opposite sides, with curved profile, and received in said recesses, said ears having elongate openings, and a rod carried by opposite sides of the box, and loosely fitted in said openings, one edge of said cover adapted to slide on an inner, vertical face of said box, while said ears slide along said recesses.

References Cited in the file of this patent
UNITED STATES PATENTS

| | | |
|---|---|---|
| 572,217 | Rebmann | Dec. 1, 1896 |
| 988,974 | Chapman | Apr. 11, 1911 |
| 1,108,283 | Van Ness | Aug. 25, 1914 |
| 1,862,811 | Strong | June 14, 1932 |
| 2,014,696 | Pitman et al. | Sept. 17, 1935 |